(12) United States Patent
Schlemmer et al.

(10) Patent No.: US 10,808,561 B2
(45) Date of Patent: Oct. 20, 2020

(54) SEAL ARRANGEMENT FOR A TURBOMACHINE, METHOD FOR MANUFACTURING A SEAL ARRANGEMENT AND TURBOMACHINE

(71) Applicant: MTU Aero Engines AG, Munich (DE)

(72) Inventors: Markus Schlemmer, Mainburg/Sandelzhausen (DE); Klaus Pirker, Klagenfurt (AT); Lukasz Sosnowka, Rzeszow (PL); Bernd Kislinger, Reisgang (DE); Rudolf Stanka, Rattenkirchen (DE); Marcin Regulski, Rzeszow (PL)

(73) Assignee: MTU Aero Engines AG, Munich (DE)

( * ) Notice: Subject to any disclaimer, the term of this patent is extended or adjusted under 35 U.S.C. 154(b) by 87 days.

(21) Appl. No.: 15/990,652

(22) Filed: May 27, 2018

(65) Prior Publication Data
US 2018/0340435 A1 Nov. 29, 2018

(30) Foreign Application Priority Data
May 29, 2017 (EP) .................................... 17173194

(51) Int. Cl.
*F01D 11/00* (2006.01)
*F02C 7/28* (2006.01)
(Continued)

(52) U.S. Cl.
CPC ............ *F01D 11/001* (2013.01); *F01D 9/041* (2013.01); *F01D 25/246* (2013.01); *F02C 7/28* (2013.01);
(Continued)

(58) Field of Classification Search
CPC ...... F01D 11/00; F01D 11/001; F01D 11/003; F01D 9/041; F01D 25/246; F02C 7/28;
(Continued)

(56) References Cited

U.S. PATENT DOCUMENTS 4,767,267 A 8/1988 Salt et al.
5,215,435 A 6/1993 Webb et al.
(Continued)

FOREIGN PATENT DOCUMENTS

DE 2922554 A1 2/1980
DE 3724210 A1 6/1988
(Continued)

*Primary Examiner* — Richard A Edgar
(74) *Attorney, Agent, or Firm* — Barlow, Josephs & Holmes, Ltd.

(57) ABSTRACT

The invention relates to a seal arrangement for a turbomachine, especially for an aircraft engine, for sealing a radial gap between a rotor and a stator, comprising at least one seal carrier for the supporting and/or fastening of at least one seal element, wherein the seal carrier comprises a radial crosspiece extending in a radial direction of extension and an axial crosspiece, formed as a single piece with the latter and extending in an axial direction of extension, wherein the seal element is arranged at a radially inner-lying bearing surface of the axial crosspiece, and a front ring or a front ring segment, viewed in the flow direction, and/or a rear ring or a rear ring segment, each with a radially running crosspiece.

13 Claims, 3 Drawing Sheets

(51) Int. Cl.
  *F01D 9/04* (2006.01)
  *F01D 25/24* (2006.01)
  *F16J 15/44* (2006.01)

(52) U.S. Cl.
  CPC ....... *F16J 15/444* (2013.01); *F05D 2220/323* (2013.01); *F05D 2230/232* (2013.01); *F05D 2230/237* (2013.01); *F05D 2230/25* (2013.01); *F05D 2240/11* (2013.01); *F05D 2240/55* (2013.01)

(58) Field of Classification Search
  CPC .............. F16J 15/444; F05D 2220/323; F05D 2220/232; F05D 2220/237; F05D 2220/25; F05D 2240/11; F05D 2240/55
  See application file for complete search history.

(56) References Cited

U.S. PATENT DOCUMENTS

| | | | |
|---|---|---|---|
| 6,179,560 B1 | 1/2001 | Kouris et al. | |
| 7,341,429 B2 | 3/2008 | Montgomery et al. | |
| 7,465,149 B2 * | 12/2008 | Dixon | F01D 5/081 |
| | | | 415/116 |
| 7,635,251 B2 | 12/2009 | Duesler et al. | |
| 8,662,835 B2 | 3/2014 | Fachat et al. | |
| 2011/0044798 A1 | 2/2011 | Digard Brou De Cuissart et al. | |
| 2011/0236185 A1 | 9/2011 | Piggott et al. | |

FOREIGN PATENT DOCUMENTS

| | | |
|---|---|---|
| DE | 102008048006 A1 | 3/2010 |
| DE | 102012201050 A1 | 7/2013 |
| DE | 102014212174 A1 | 12/2015 |
| EP | 1433926 A2 | 6/2004 |
| EP | 2060741 A2 | 5/2009 |
| EP | 2551454 A2 | 1/2013 |
| EP | 2559849 A2 | 2/2013 |
| EP | 2722486 A1 | 4/2014 |
| EP | 2762684 A1 | 8/2014 |
| EP | 3012413 A1 | 4/2016 |
| FR | 3003599 A1 | 9/2014 |
| JP | 2003343206 A1 | 12/2003 |
| JP | 3911571 B2 | 5/2007 |

* cited by examiner

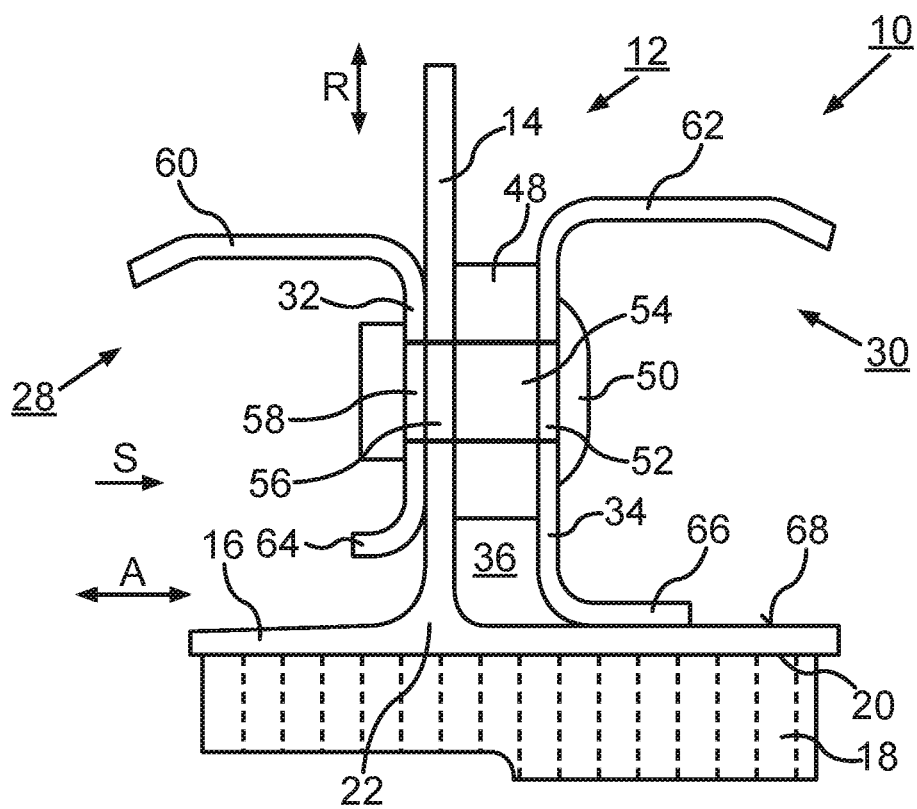
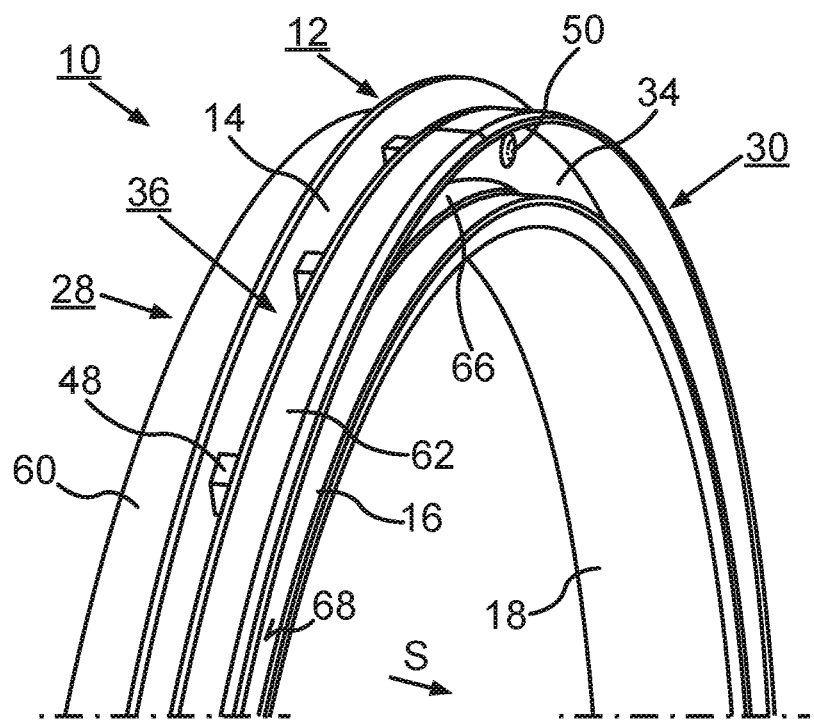

SEAL ARRANGEMENT FOR A TURBOMACHINE, METHOD FOR MANUFACTURING A SEAL ARRANGEMENT AND TURBOMACHINE

BACKGROUND OF THE INVENTION

The invention relates to a seal arrangement for a turbomachine, especially for an aircraft engine. Further aspects of the invention relate to a method for manufacturing a seal arrangement for a turbomachine as well as a turbomachine.

In the manufacturing of turbomachines, it is known how to assemble guide vane rings from a plurality of guide vane segments. Such guide vane rings serve for the orienting of a medium (the working medium) flowing through these turbomachines during their operation. By the guide vane rings, at least a portion of the kinetic energy of the flowing medium can be transformed into a swirl energy during the orienting process. This swirl energy can be used to move (drive) a rotor connecting to the guide vane ring and thereby place a drive shaft of the turbomachine connected to the rotor in a rotational motion. In order to be able to operate turbomachines with a relatively high efficiency, it makes sense to keep as small as possible any gaps, such as those between the guide vane ring and a shaft housing part adjoining thereto in a radial direction of extension, such as a rotor housing of the turbomachine. In this way, an unwanted fluid leakage of the medium can be prevented, at least for the most part.

From JP 2003343206 A1 there is known a seal arrangement according to the preamble of claim 1. The drawback to this already known design, however, is that the attachment of the stator element to the seal arrangement is very massive in design. Furthermore, fluid leakages of the medium occur in the region of the attachment between the stator element and the seal arrangement, especially in a mount for the stator element. These fluid leakages are present in particular in the region of an axial crosspiece of a seal carrier of the seal arrangement. In this region, the mount for the stator element is not adequately leaktight.

EP 2 762 684 A1 describes a comparable seal arrangement for a turbomachine. Here, a seal mount of the seal arrangement is fashioned as a single piece, in particular being cast or forged. The drawback to this known seal mount, however, is that the axial crosspiece for the arrangement of a seal element is very short in configuration. This already known design is intended in particular for the arrangement of brush seals. However, a honeycomb seal may also be arranged on the axially extending support section of the axial crosspiece. However, the supporting or bearing surface of the axial crosspiece is very small in construction and therefore only suited to accommodate honeycomb seals with a small surface. Therefore, leaks may occur in the region of the radial gap being sealed off between the rotor and the stator.

Other seal arrangements of this kind for turbomachines are known from EP 2 060 741 A2 and EP 2 551 454 A2. Both seal arrangements have a very massive construction, since two radial crosspieces are formed on one seal carrier to produce a mount for the stator element. Besides a relatively heavy weight, these known seal arrangements are more difficult to manufacture, since material needs to be removed from the intermediate space between the axial crosspieces.

SUMMARY OF THE INVENTION

The object of the present invention is to provide a seal arrangement for a turbomachine, a method for manufacturing a seal arrangement for a turbomachine as well as a turbomachine of the kind mentioned above, which in particular has an improved tightness to prevent fluid leakage.

This object is achieved by a seal arrangement, a method, as well as a turbomachine in accordance with the present invention. Advantageous embodiments with appropriate enhancements of the invention are discussed in detail below, wherein advantageous embodiments of each aspect of the invention are to be seen as advantageous embodiments of the other aspects of the invention, and vice versa.

A first aspect of the invention relates to a seal arrangement for a turbomachine, especially for an aircraft engine, for sealing a radial gap between a rotor and a stator, comprising at least one seal carrier for the supporting and/or fastening of at least one seal element, wherein the seal carrier comprises a radial crosspiece extending in a radial direction of extension and an axial crosspiece, formed as a single piece with the latter and extending in an axial direction of extension, and the seal element is arranged at a radially inner-lying bearing surface of the axial crosspiece. The seal arrangement furthermore comprises a front ring or a front ring segment looking in the flow direction of the turbomachine and/or a rear ring or a rear ring segment, each with a radially running crosspiece. One of these radially running crosspieces forms, with the radial crosspiece of the seal carrier, a mount for the uptake of an element of the stator, wherein an axially extending inner flange is formed at a radially inner end of at least one of the radially running crosspieces and at least the inner flange of the radially running crosspiece, which forms the mount with the axial crosspiece of the seal carrier, is joined by integral-bonding and/or form-fitting to a radially inner-lying surface of the axial crosspiece. For example, the inner flange may be welded or soldered to the surface of the axial crosspiece. Screw, plug-in or clamping connections or combinations of integral-bonding and form-fitting connections are also conceivable. The integral bonding and/or form-fitting connection of the inner flange to the axial crosspiece of the seal carrier advantageously ensures a tight seal for the mount for the stator element in this region. Fluid leakage of the medium of the turbomachine is prevented. Thanks to the improved tightness in this region, the efficiency of the turbomachine is significantly increased.

In another advantageous embodiment of the seal arrangement according to the invention, an axially extending outer flange is formed at a radially outer end of at least one of the radially running crosspieces of the rings or ring segments. For example, the outer flange interacts with a correspondingly designed component of an adjacent rotating blade row, in order to prevent a direct radial outflow of the flow medium, especially the hot gas, from the flow duct into the radially inner housing structure.

In another advantageous embodiment of the seal arrangement according to the invention, the front ring or the front ring segment and/or the rear ring or the rear ring segment are fashioned as sheet metal elements. In this way, the front ring or the front ring segment and/or the rear ring and/or the rear ring segment are formed as sheet metal elements. In this way, the front ring or the front ring segment and/or the rear ring or the rear ring segment can be manufactured very easily and in particular as a lightweight structural element. On the whole, this produces advantageously a significant weight reduction of the seal arrangement according to the invention as compared to the seal arrangements known in the prior art. The production of the rings or ring segments may be carried out here by rolling. Usually the rings or ring segments are fashioned as a single piece. However, the possibility also exists of fabricating the individual elements of the front or rear ring or ring segment from individual pieces and to weld or solder these together, for example. Furthermore, the possibility exists of fabricating the mentioned rings or ring segments from a nickel-based material, for example, especially by a chip removal process or also an additive manufacturing method.

In another advantageous embodiment of the seal arrangement according to the invention, the seal carrier is designed as T-shaped, such that the axial crosspiece extends in the axial direction at both ends beyond a connection region between the radial crosspiece and the axial crosspiece. Thanks to this embodiment of the seal carrier, a relatively large, radially inner-lying bearing surface of the axial crosspiece is advantageously provided for the supporting and/or fastening of the at least one seal element. The seal element is usually designed as a honeycomb seal. But the possibility also exists of fastening brush-like seal elements to the axial crosspiece of the seal carrier.

The single-piece, T-shaped seal carrier preferably has precisely one radial crosspiece. This is especially advantageous for the manufacture, since, for example, no expensive material needs to be removed between two radial crosspieces. Furthermore, a weight saving is possible compared to solidly formed seal carriers having two or more radial crosspieces.

In further advantageous embodiments of the seal arrangement according to the invention, the element of the stator is a vane root or a vane root segment of a guide vane ring, a guide vane ring segment, or a guide vane of the turbomachine. The seal arrangement in this case may be designed as a so-called SIAS (Static Inner Air Seal) ring or SIAS ring segment.

Furthermore, a sliding block may be connected by at least one axial bolt to the radially running crosspieces of the front or rear rings or ring segments and to the axial crosspiece of the seal carrier. The axial bolt engages through corresponding openings in the mentioned elements in this case. This produces an axial securement of the vane root to the seal arrangement. The sliding block may be composed of metal, a metal alloy, ceramic or other suitable materials, especially materials resistant to high temperatures.

In further advantageous embodiments of the seal arrangement according to the invention, the seal carrier of the seal arrangement is produced as a single piece by forging, casting, lathe turning or an additive manufacturing method. In this way, the seal carrier has a very stable configuration and can furthermore be produced in a cost-favorable manner. Thus, a full force transmission can occur across the seal carrier and therefore the seal arrangement as a whole.

A second aspect of the invention relates to a method for manufacturing a seal arrangement for a turbomachine according to the first aspect of the invention, comprising at least the following method steps: producing a seal carrier of the seal arrangement by forging, casting, lathe turning or an additive manufacturing method; arranging a front ring or a front ring segment and/or a rear ring or a rear ring segment in the region of the radial crosspiece of the seal carrier to form a mount for a stator element; and integral-bonding and/or form-fitting connection of an axially extending inner flange of the front ring or front ring segment and/or rear ring or rear ring segment forming the mount to a radially inner-lying surface of an axial crosspiece of the seal carrier. In particular, the single-piece manufacture of the seal carrier can be carried out easily and inexpensively and results in an extremely structurally stable seal carrier. Furthermore, the integral-bonding and/or form-fitting connection between the axially extending inner flange and the surface of the axial crosspiece of the seal carrier ensures a sealing of the mount created in this region against the housing structures surrounding this region. In this way, the tightness of the seal arrangement, especially the tightness in the region of a radial gap between a rotor and a stator is significantly increased. In this case, the inner flange may be welded or soldered to the surface of the axial crosspiece. Other integral-bonding connection options are also conceivable. Furthermore, the inner flange may also be screwed together with the mentioned surface or glued or adhesively bonded to it, or connected by a plug connection or a clamping connection. Combinations of integral-bonding and form-fitting connections are also conceivable.

Further advantages result if the front ring or the front ring segment and/or the rear ring or the rear ring segment are fashioned as sheet metal elements. In particular, they can be produced as a single piece by a corresponding rolling process. But a welding or soldering of several individual elements of the mentioned rings or ring segments is also conceivable. In combination with the seal carrier produced as a single piece, which may, in particular, be composed of metal or metal alloys, such as nickel-based materials, for example, and the design of the rings or ring segments as sheet metal elements, a kind of hybrid construction results, leading to an overall significant weight reduction of the seal arrangement.

Additional features and their advantages will be found in the descriptions of the first aspect of the invention, wherein advantageous embodiments of the first aspect of the invention should be seen as advantageous embodiments of the second aspect of the invention, and vice versa.

A third aspect of the invention relates to a turbomachine, especially an aircraft engine, with at least one seal arrangement according to the first aspect of the invention and/or with at least one seal arrangement manufactured by a method according to the second aspect of the invention. The features and their advantages of the third aspect of the invention will be found in the descriptions of the first and second aspect of the invention, wherein advantageous embodiments of the first and second aspects of the invention should be seen as advantageous embodiments of the third aspect of the invention, and vice versa. In particular, the efficiency of the turbomachine according to the invention can be increased significantly.

BRIEF DESCRIPTION OF THE DRAWING FIGURES

Further features of the invention will emerge from the claims, the exemplary embodiment, as well as the drawings. The features and combinations of features mentioned above in the description as well as the features and combinations of features mentioned below in the exemplary embodiment may be used not only in the particular indicated combination, but also in other combinations, without leaving the scope of the invention. Herein are shown:

FIG. 1 is a schematic cross-sectional representation of the seal arrangement according to the invention;

FIG. 2 is a schematic perspective representation of the seal arrangement according to the invention according to FIG. 1;

DESCRIPTION OF THE INVENTION

Figure 3:
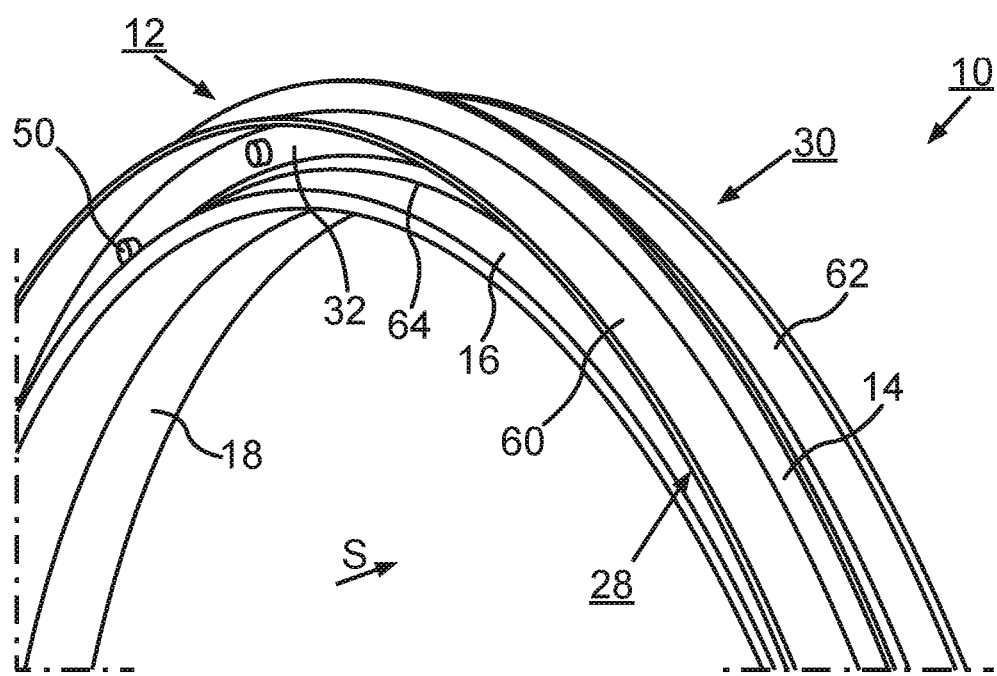
FIG. 3 is another schematic perspective representation of the seal arrangement according to the invention according to FIG. 1.

FIG. 1 shows a schematic cross-sectional representation of a seal arrangement for a turbomachine, especially for an aircraft engine. The seal arrangement here serves for sealing off a radial gap between a rotor and a stator of the turbomachine. In the exemplary embodiment shown (see also FIGS. 2 and 3), the stator involves a guide vane ring of a gas turbine.

The seal arrangement 10 comprises a seal carrier 12 for the supporting and/or fastening of a seal element 18, the seal carrier 12 having a radial crosspiece 14 extending in a radial direction of extension R and an axial crosspiece 16, formed as a single piece with the former and extending in an axial direction of extension A. The terms "radial" and "axial" may also cover directions deviating from an ideal axial or radial direction of extension. Departures from the ideal axial or radial direction of extension in an angle range between +15° and −15° are conceivable. One will notice that the seal element 18 is arranged on a radially inner-lying bearing surface 20 of the axial crosspiece 16. In the exemplary embodiment shown, the seal element 18 involves a honeycomb seal. The honeycomb seal may be composed of the usual materials, especially metal, a metal alloy, ceramic, or also combinations of these materials. The seal carrier 12 is produced as a single piece by forging, casting or an additive manufacturing method. In turn, the materials for the seal carrier 12 may be metals, metal alloys, or other high temperature suitable materials or a combination thereof. In particular, the material of the seal carrier may be a nickel-based material. In the exemplary embodiment shown, several seal elements 18 are arranged next to one another in the peripheral direction on the axial crosspiece 16 and form a closed or nearly closed seal element ring comprising a rotor hub (also see FIGS. 2 and 3). By "arranging" the seal element 18 on the axial crosspiece 16 is meant an integral-bonding and/or form-fitting, detachable or non-detachable connection. Furthermore, the possibility exists of arranging one or more intermediate layers or also supporting elements for the seal element 18 between the radially inner-lying bearing surface 20 of the axial crosspiece 16 and the corresponding bearing surface of the seal element 18.

Furthermore, one will notice that the seal arrangement 10 comprises a front ring or a front ring segment 28, viewed in the flow direction S, and a rear ring or a rear ring segment 30, each having a radially extending crosspiece 32, 34. Several front or rear ring segments 28 form a corresponding front or rear ring of the seal arrangement 10. In the exemplary embodiment shown, the front ring segment 28 has a radially inner-lying, axially extending inner flange 64 and a radially outer-lying, axially extending outer flange 60, the outer flange 60 and the inner flange 64 being joined as a single piece to the radially extending crosspiece 32. The rear ring segment 30 likewise has a radially inner-lying, axially extending inner flange 66 and a radially outer-lying, likewise axially extending outer flange 62. The inner flange 66 and the outer flange 62 are in turn joined as a single piece to the crosspiece 34.

Figure 4:
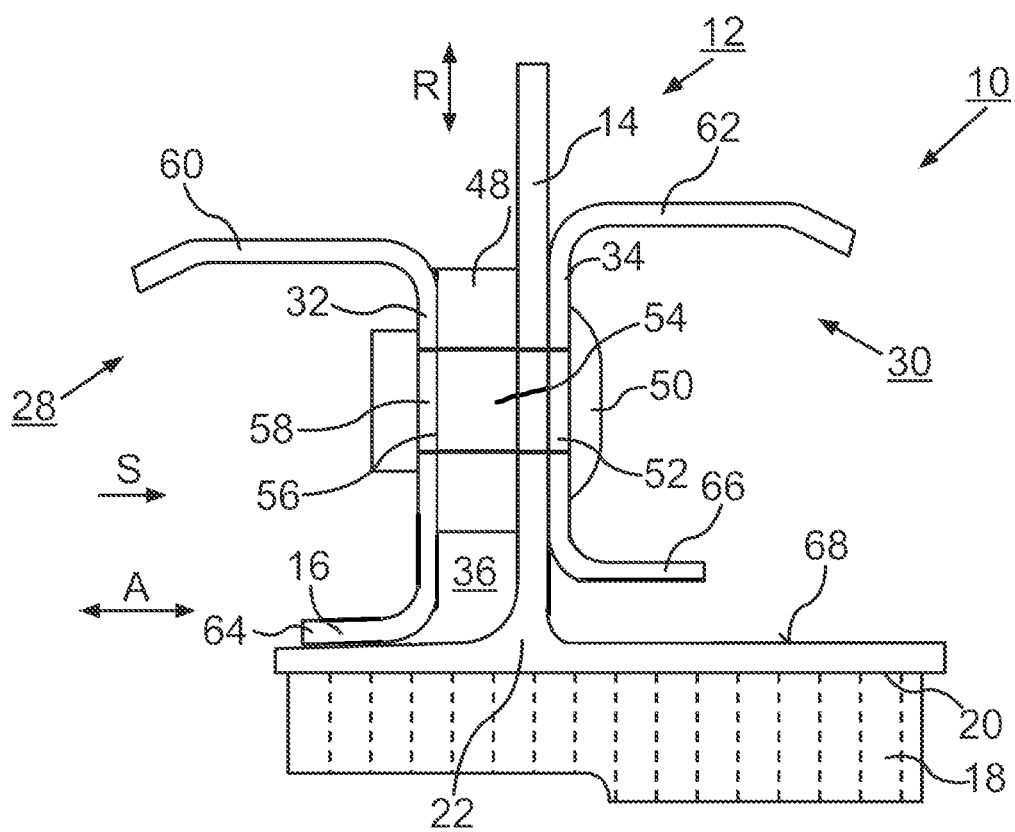
FIG. 4 is a schematic cross-sectional representation of a seal arrangement according to a second exemplary embodiment.

Furthermore, one will notice that the crosspiece 34 forms, with the radial crosspiece 14 of the seal carrier 12, a mount 36 to take up an element of the stator. In the exemplary embodiment shown, the mount 36 serves for taking up, supporting and fastening of a vane root or vane root segment 38 of a guide vane ring segment 24. Basically, the stator element so received may be a housing section of the turbomachine, a section of a guide vane, a section of a vane holder or the like. For example, the seal arrangement 10 can be situated in the region of a low-pressure turbine of an aircraft engine. Alternatively, as shown in FIG. 4, crosspiece 32 forms, with the radial crosspiece 14 of the seal carrier 12, a mount 36 to take up an element of the stator. In the alternative embodiment shown in FIG. 4, the mount 36 serves for taking up, supporting and fastening of a vane root or vane root segment of a guide vane ring segment.

Furthermore, one will notice that the inner flange 66 of the radially extending crosspiece 34, which forms the mount 36 with the axial crosspiece 14 of the seal carrier 12, is joined by integral bonding with a radially inner-lying surface 68 of the axial crosspiece. The inner flange 66 may be welded or soldered to the surface 68. For example, a solder film may be used for this. Furthermore, the possibility exists of employing different welding methods, such as spot, friction, ring or seam welding. The inner flange 66 may also be joined to the surface 68 by form fitting with screw, plug-in or clamping connections (not shown). Depending on the application, the material connection may also be made by gluing or adhesive bonding of the structural parts. A combination of integral-bonding and form-fitting connections is also possible.

Furthermore, it becomes evident that the front ring or the front ring segment 28 as well as the rear ring or the rear ring segment 30 in the exemplary embodiment depicted are C-shaped in cross section. The two outer flanges 60, 62 serve for stabilization of the rings 28, 30 as well as at least partial sealing of this region of the housing structure of the turbomachine against the working medium of the turbomachine.

Furthermore, one recognizes that the seal carrier is T-shaped, such that the axial crosspiece 16 extends in the axial direction A at both ends beyond a connection region 22 between the radial crosspiece 14 and the axial crosspiece 16. This produces a large flat bearing surface for the arrangement of a corresponding seal element 18. Furthermore, it becomes evident that a sliding block 48 is arranged in the recess 36, being secured by an axial bolt 50 to the seal arrangement 10. The axial bolt is led through corresponding openings 52, 54, 56, 58 in the crosspieces 32, 34, the radial crosspiece 14 and the sliding block 48 and anchored appropriately.

FIG. 2 shows a schematic perspective representation of the seal arrangement 10 according to FIG. 1. One notices the ring-shaped configuration of the seal carrier 12 as well as the front and rear rings 28, 30. Furthermore, it becomes evident that the mentioned ring shape is accomplished by the connecting of individual ring segments. The same applies to the arrangement and configuration of the seal elements 18. One notices in turn that the radial crosspiece 14 forms the mount 36 together with the crosspiece 34 of the rear ring 30. In the mount 36, the sliding blocks 48 are secured at predefined distances by the axial bolt 50. The ring-shaped inner flange 66 of the rear ring 30 lies against the radially outer-lying surface 68 of the axial crosspiece 16 and is joined to it by integral bonding. The encircling mount 36 is thereby tightly sealed in this region.

FIG. 3 shows another schematic perspective representation of the seal arrangement 10 according to FIG. 1. One recognizes the arrangement of the front ring 28 on the radial crosspiece 14 of the seal carrier 12. The front ring 28 comprises here the inner flange 64, the outer flange 60, as well as the crosspiece 32 joined as a single piece to the inner and outer flanges 64, 60.

It would be appreciated by those skilled in the art that various changes and modifications can be made to the illustrated embodiments without departing from the spirit of the present invention. All such modifications and changes are intended to be covered by the appended claims.

What is claimed is:

1. A seal arrangement for a turbomachine for sealing a radial gap between a rotor and a stator, comprising:
    at least one seal carrier for the supporting and/or fastening of at least one seal element, wherein the seal carrier comprises a radial crosspiece extending in a radial direction of an extension and an axial crosspiece, formed as a single piece with the former and extending in an axial direction of extension, wherein the seal element is arranged at a radially inner-lying bearing surface of the axial crosspiece; and
    a front ring or a front ring segment, viewed in the flow direction, and/or a rear ring or a rear ring segment, wherein the front ring or the front ring segment and/or the rear ring or the rear ring segment include a respective radially running crosspiece,
    wherein the radially running crosspiece of the front ring or the front ring segment or of the rear ring or the rear ring segment forms, with the radial crosspiece, a mount for uptake of an element of the stator, while an axially extending inner flange is formed at a radially inner end of the respective radially running crosspiece, and at least the inner flange of the respective radially running crosspiece, which forms the mount with the axial crosspiece of the seal carrier, is joined by integral bonding and/or form fitting to a radially outer-lying surface of the axial crosspiece.

2. The seal arrangement as claimed in claim 1, wherein the inner flange is welded or soldered to the radially outer-lying surface of the axial crosspiece.

3. The seal arrangement as claimed in claim 1, further comprising:
    an axially extending outer flange located at a radially outer end of the respective radially running crosspiece.

4. The seal arrangement as claimed in claim 1, wherein the front ring or the front ring segment and/or the rear ring or the rear ring segment are made of sheet metal.

5. The seal arrangement as claimed in claim 1, wherein the seal carrier is T-shaped with the axial crosspiece extending in the axial direction at both ends beyond a connection region between the radial crosspiece and the axial crosspiece.

6. The seal arrangement as claimed in claim 1, wherein the element of the stator is a vane root or a vane root segment of a guide vane ring, a guide vane ring segment or a guide vane of the turbomachine.

7. The seal arrangement as claimed in claim 1, wherein a sliding block is connected by at least one axial bolt to the respective radially running crosspiece and to the radial crosspiece.

8. The seal arrangement as claimed in claim 1, wherein the seal carrier of the seal arrangement is produced by forging, casting, lathe turning, or an additive manufacturing method.

9. The seal arrangement as claimed in claim 1, wherein the seal element is a honeycomb seal.

10. The seal arrangement as claimed in claim 1, wherein the seal arrangement is a Static Inner Air Seal (SIAS) ring or a ring segment thereof.

11. The seal arrangement as claimed in claim 1,
    wherein the seal carrier of the seal arrangement is formed by forging, casting, lathe turning, or an additive manufacturing method; and
    wherein the front ring or the front ring segment and/or the rear ring or the rear ring segment in the region of the radial crosspiece of the seal carrier is configured and arranged as the mount for the stator element.

12. The seal arrangement as claimed in claim 11, wherein the inner flange is welded or soldered to the radially outer-lying surface of the axial crosspiece.

13. The seal arrangement of claim 1, wherein at least one the seal arrangement is configured and arranged in a turbomachine.

* * * * *